United States Patent [19]

Abaziou et al.

[11] Patent Number: 4,930,127
[45] Date of Patent: May 29, 1990

[54] METHOD AND DEVICE FOR TRANSMITTING A DIGITAL ENGINEERING SERVICE CHANNEL BY MEANS OF THE PARITY CHANNEL OF A DIGITAL BIT STREAM TRANSMITTED IN A CODE WITH PARITY CHECKING

[75] Inventors: Jean-Luc Abaziou, Pleumeur Bodou; Jean-Claude Billy; Bernard Le Mouel, both of Saint Quay Perros, all of France

[73] Assignee: Societe Anonyme dite : Alcatel CIT, Paris, France

[21] Appl. No.: 284,579

[22] Filed: Dec. 15, 1988

[30] Foreign Application Priority Data

Dec. 17, 1987 [FR] France .............................. 87 17644

[51] Int. Cl.$^5$ .......................................... H04L 25/48
[52] U.S. Cl. ............................................. 370/110.4
[58] Field of Search .................. 370/110.1, 110.4, 111, 370/11; 371/49, 55, 49.1

[56] References Cited

U.S. PATENT DOCUMENTS

| | | | |
|---|---|---|---|
| 4,387,460 | 6/1983 | Boutmy et al. | 370/110.4 |
| 4,393,493 | 7/1983 | Edwards | 370/110.4 |
| 4,408,325 | 10/1983 | Grover | 370/110.4 |
| 4,633,464 | 12/1986 | Anderson | 370/110.4 |
| 4,682,334 | 7/1987 | Le Mouel et al. | 371/49 |

FOREIGN PATENT DOCUMENTS 0162442 11/1985 European Pat. Off. .
8500945 2/1985 PCT Int'l Appl. .

OTHER PUBLICATIONS

Journal of Lightwave Technology, vol. LT-2, No. 6, Dec. 1984, pp. 991-997, "The SL Supervisory System".
IEEE Journal on Selected Areas in Communications, SAC-2, No. 6, Nov. 1984, pp. 1042-1046, "Terminal Transmission Equipment (TTE) for the SL Undersea Lightwave System".

Primary Examiner—Douglas W. Olms
Assistant Examiner—Melvin Marcelo
Attorney, Agent, or Firm—Sughrue, Mion, Zinn, Macpeak & Seas

[57] ABSTRACT

The method enables transmission of a digital service channel by means of the parity channel of a digital bit stream transmitted in a parity checking code with parity words inserted at specific times by modifying certain parity words violating the parity checking code parity law. It consists in modifying spaced groups of even number of consecutive parity words so as not to disrupt analog detection of line errors. A digital service channel insertion circuit is included among the component parts of an MBIPIC type encoder whereby the data of a digital bit stream is transmitted by consecutive code words each formed of a block of data bits completed by a parity bit and an inversion bit. The digital service channel insertion circuit includes a modulator operative in a first computation logic circuit delivering the real value of the parity bit and a shaper circuit which strobes the digital service channel data at a timing rate that is low compared with that of the code words and selectively applies to the modulator according to the result of said strobing a pulse having the width of two code words.

6 Claims, 6 Drawing Sheets

FIG.3
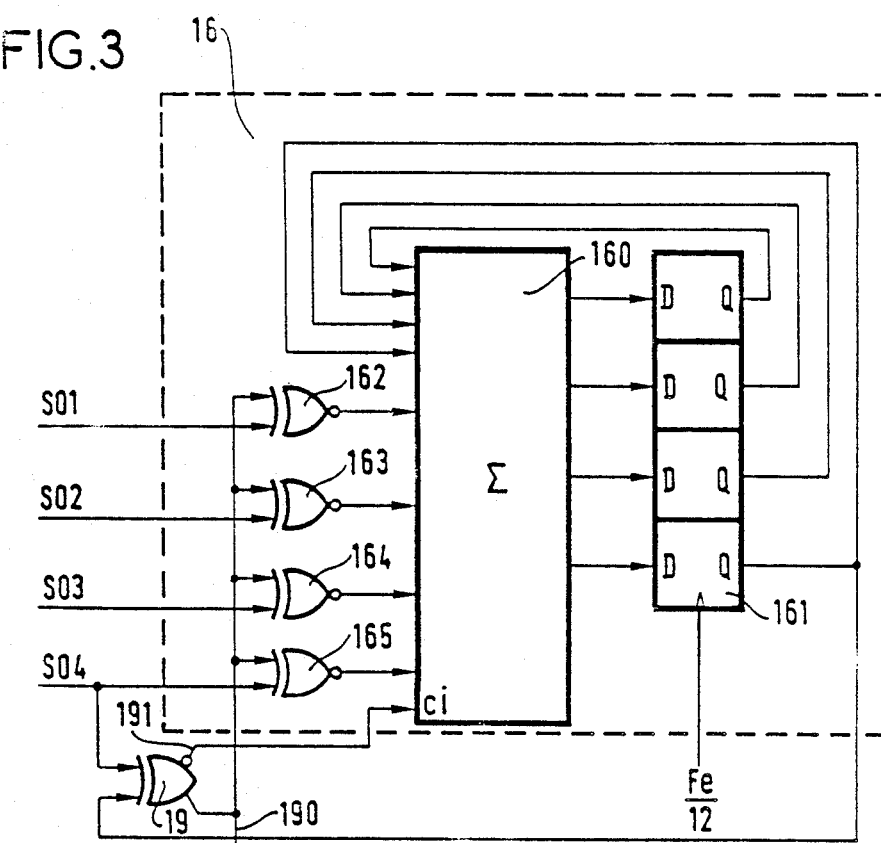
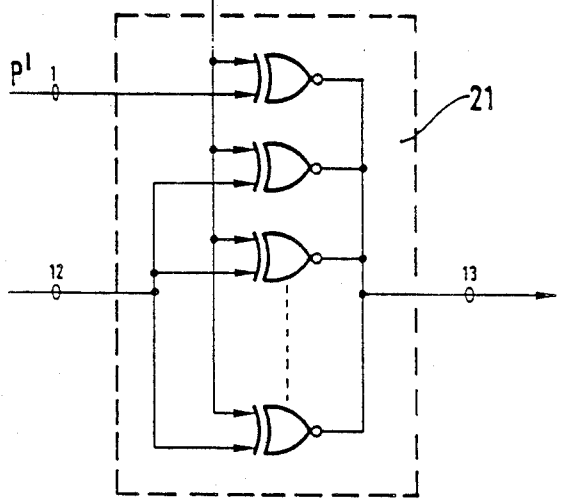

to say maintaining constant the parity of a specified
METHOD AND DEVICE FOR TRANSMITTING A DIGITAL ENGINEERING SERVICE CHANNEL BY MEANS OF THE PARITY CHANNEL OF A DIGITAL BIT STREAM TRANSMITTED IN A CODE WITH PARITY CHECKING

BACKGROUND OF THE INVENTION

1. Field of the Invention

The present invention relates to synchronous data transmission whereby a digital bit stream is transmitted at a high data rate in a code with parity checking, that is type of the state of data of the digital bit stream transmitted by means of parity words appearing in the digital bit stream at specific times separated by a constant or variable duration. It is more particularly concerned with the transmission of an engineering service channel low data rate digital bit stream through the intermediary of the channel constituted by the parity words.

2. Description of the Prior Art

Codes with parity checking introduce into the line signal a parity law violations of which, in the event of line errors, lend themselves to analog detection as described, for example, in U.S. Pat. No. 4,121,195 and entailing the detection of variations that they cause in the longer term in the DC component of the output signal of a bistable circuit changing state on each of said specified type states of the data in the digital bit stream transmitted.

It is already known to transmit a low data rate digital bit stream for a service channel through the intermediary of the parity channel of a digital bit stream transmitted in a code with parity checking either as described in U.S. Pat. No. 4,387,460 by modulating a transmitted carrier by regularly spaced isolated parity word modifications leading to a periodic violation of the parity law at a frequency that is low in comparison with the frequency of occurrence of the parity words or as described in U.S. Pat. No. 4,633,464 by using the locations of regularly spaced isolated parity words to transmit oversampled data of the service channel low data rate digital bit stream. Both methods have the disadvantage of disrupting analog detection of line errors as this is highly sensitive to isolated violations of the parity law.

An object of the present invention is to avoid this disadvantage and to enable analog detection of line errors during the transmission of a service channel low data rate digital bit stream through the intermediary of the parity channel of a high data rate digital bit stream transmitted in a code with parity checking.

SUMMARY OF THE INVENTION

The invention consists in a method of transmitting a digital service channel by means of the parity channel of a digital bit stream transmitted in a code with parity checking with parity words inserted at specific times by modifying spaced groups of even numbers of consecutive parity words violating the parity law of the parity checking code whereby said modifications produce in the digital bit stream transmitted in the parity checking code packets of consecutive violations of the parity law which do not disrupt analog detection of line errors as they do not change the state of the bistable circuit on occurences of unmodified parity words.

The invention also consists in a device for implementing the aforementioned method.

Other characteristics and advantages of the invention will emerge from the following description of one embodiment given by way of example in connection with a digital link using an MB1P1C type parity checking code, also known as an MB1C1P code. This description will be given with reference to the appended drawings in which:

BRIEF DESCRIPTION OF THE DRAWINGS

FIG. 3 is a schematic showing a running digital sum computer and an inverter circuit which are component parts of the encoder from FIG. 1.

DESCRIPTION OF THE PREFERRED EMBODIMENT

The embodiment to be described concerns the insertion of a low data rate binary data bit stream Té into the parity channel of a high data rate (Fe) binary data bit stream Te transmitted in the MB1P1C code known, together with the encoder and decoder for implementing it, from French patent application No. FR-A-2.570.905.

The MB1P1C code is a block code whereby the data to transmit is encoded by consecutive code words each formed by a block of M data bits completed by a frame bit and by an inversion bit indicating whether the block and its frame bit have been inverted to keep the running digital sum within limits, the frame bit being constituted by a parity bit further enabling the word subdivision to be identified. In the example described hereinafter, M takes the value 12, the inversion bit is by convention at logic 1 when inversion has been applied and the frame bit has a logic value such that the 14-bit code word obtained has an even parity.

Figure 1:
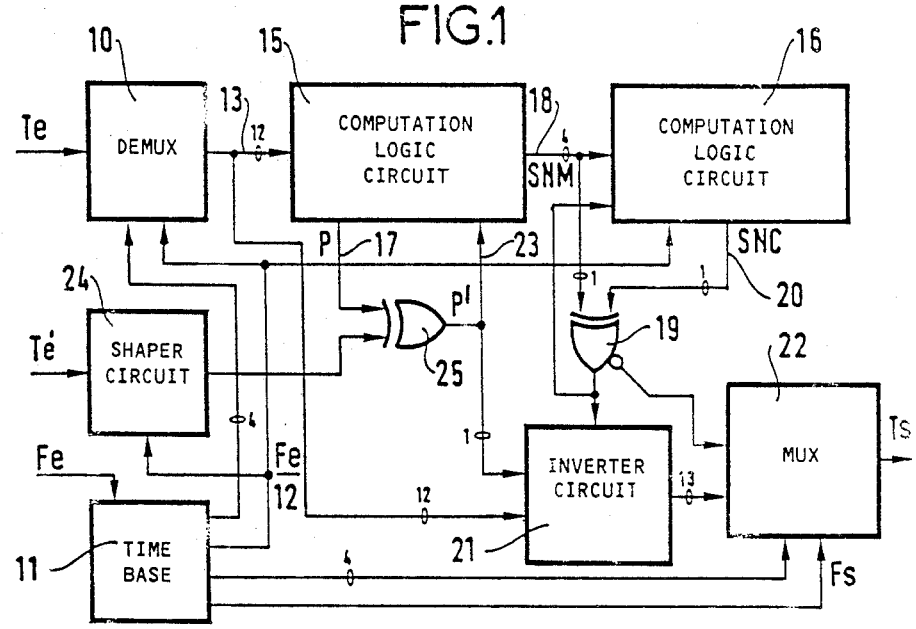
FIG. 1 is a schematic representation of a circuit for inserting a digital service channel shown in the context of the component parts of an MB1P1C encoder.

FIG. 1 shows the component parts of a 12B1P1C encoder with which are associated the component parts of a circuit for inserting into the parity channel binary digital service channel binary data having a data rate equal to one sixteenth that of the code words.

The 12B1P1C encoder which receives on its input the high data rate (Fe) isochronous binary data bit stream Te and delivers at its output a binary bit stream Ts at an output data rate Fs greater than the input data rate Fe by a factor 14/12 comprises:

a timebase 11 synchronized to the data rate Fe of the incident digital bit stream and producing various clock signals, a demultiplexer 10 at the input and controlled by the timebase 11 to convert the incident binary bit stream Te into consecutive blocks of 12 parallel bits, a first computation logic circuit 15 with a main input 13 receiving the consecutive blocks of 12 bits from the demultiplexer 10 and an auxiliary input 23 receiving a modified value p' of the parity bit to transmit the low data rate digital bit stream which computes both the normal value p of the parity bit associated with each block of 12 bits available at an output 17 and the value of a signed digital sum SNM available at an output 18 corresponding to the binary word constituted by the block of 12 bits delivered by the demultiplexer 10 completed by a bit having the modified value p' of the parity bit and by an inversion bit C preset to logic 0, the value chosen to indicate a block that has not been inverted, a second computation logic circuit 16 which receives at an input the word digital sum SNM delivered by the first computation logic circuit 15, the output signal of an inversion decision circuit 19 and the timing signals (at Fe/12) of the succession of blocks of 12 bits from the output of the demultiplexer 10 and which delivers on its output 20 the sign of the running digital sum SNE of the binary bit stream Ts generated by the encoder, an inversion decision circuit 19 constituted by an "exclusive-OR" type logic gate with complemented and non-complemented outputs comparing the sign of the word digital sum with that of the running digital sum SNC, an inverter circuit 21 operating under the control of the inversion decision circuit 19 on the block of 12 bits available at the output of the demultiplexer 10 and on the modified value p' of the parity bit, and a multiplexer circuit 22 which receives the 13-bit word delivered by the inverter circuit and the complemented output signal of the inversion decision circuit 19 constituting the inversion bit, makes available the temporal windows needed for inserting the inversion bit C and the parity bit P and delivers the encoded data isochronous digital bit stream Ts under the control of the timebase 11.

The circuit for inserting the digital service channel binary data Té into the parity channel of the encoded binary bit stream Ts is operative within the component parts of the encoder at the level of the first computation logic circuit 15 and the inverter circuit 21 through the intermediary of a modulator constituted by a two-input "exclusive-OR" type logic gate 25 delivering to these two circuits the modified value p' of the parity bit under the control of the output 17 of the first computation logic circuit 15 supplying the real value p of the parity bit and a shaper circuit 24 which under the control of the timebase 11 strobes the service channel binary data Té every 16 code words and, depending on the result, delivers or does not deliver a pulse having the same width as two code words.

Figure 2:
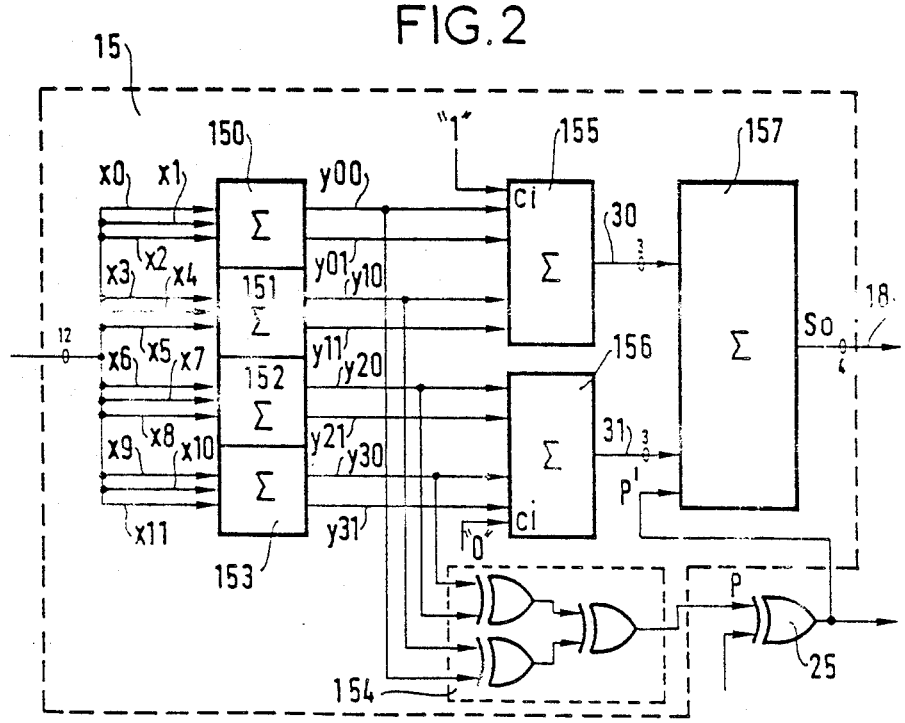
FIG. 2 is a schematic showing a parity and word digital sum computer forming part of the encoder from FIG. 1.

FIG. 2 shows in detail the structure of the first computation logic circuit 15 of the encoder at which is operative the modulator 25 of the circuit for inserting the digital service channel binary data Té. It comprises a plurality of binary adders in cascade. A first group of four full binary adders 150, 151, 152, 153 operating on three one-bit binary numbers receives on its inputs the 12 parallel bits delivered by the demultiplexer 10. A partial adder 154 for four one-bit binary numbers delivering only the least significant bit of the result of the addition has its inputs connected to the outputs of the least significant bits of the four adders of the first group of adders and supplies at its output the normal value of the parity bit. A second group of two full adders 155, 156 for two two-bit binary numbers adds in pairs the numbers delivered by the first group of adders in the presence of a zero order carry reflected for one of them (155) in a logic 1 at its carry input Ci and for the other of them (156) in a logic 0 at its carry input Ci. A final full adder 157 for two four-bit binary numbers adds the numbers delivered by the second group of adders 155, 156 in the presence of a zero order carry constituted by the modified value p' of the parity bit output by the modulator 25 of the circuit for inserting the digital service channel binary data Té.

The parity of the block of 12 bits available at the output of the demultiplexer 10 is that of the number of ones that it contains. In binary, it corresponds to the value of the least significant bit of the sum of the 12 bits of the block considered as 12 independent one-bit binary numbers. This summation is done in two stages, during one of which the first group of adders 150, 151, 152, 153 computes four partial sums $y_0$, $y_1$, $y_2$, $y_3$ on the 12 bits three at a time and during the other of which the partial adder 154 computes the value of the least significant bit of the sum of the most significant bits $y_{00}$, $y_{10}$, $y_{20}$, $Y_{30}$ of the four partial sums.

The partial adder 154 may be constituted, as shown, by a cascade of three "exclusive-OR" type logic circuits with two inputs. It delivers the value p of the parity bit which is logic 1 or logic 0 depending on whether the 12-bit block is odd or even.

The word constituted by the block of 12 bits delivered by the demultiplexer 10 and the normal value p of its parity bit P has a constant even parity. The 14-bit word constituted by the block of 12 bits delivered by the demultiplexer 10, the value p of the parity bit and the inversion bit C preset to a particular logic level (in this instance logic 0) has a constant even parity.

This parity property is conserved in an inversion by virtue of the even number of bits.

The word digital sum SNM, possibly inverted, is proportional to the difference between the number of ones and the number of zeros in the word formed by the block of 12 bits available at the output of the demultiplexer 10, the modified value p' of its parity bit and its inversion bit C.

Let $\alpha$ be the number of ones; the number of zeros will be:

$$14 - \alpha$$

and the word digital sum SNM is given by the expression:

$$\begin{aligned} SNM &= k[\alpha - (14 - \alpha)] \\ &= 2k(\alpha - 7) \end{aligned}$$

where k is an arbitrary coefficient of proportionality.

Let $x_0, \ldots x_{11}$ be the 12 bits available in parallel at the output of the demultiplexer 10; the number $\alpha$ is given by the expression:

$$\alpha = \sum_{i=0}^{11} x_i + C + p'$$

Let $y_0, \ldots y_3$ be the partial sums computed by the first group of adders 150, 151, 152, 153, respectively:

$$y_0 = x_0 + x_1 + x_2$$

$$y_1 = x_3 + x_4 + x_5$$

$$y_2 = x_6 + x_7 + x_8$$

$$y_3 = x_9 + x_{10} + x_{11}$$

The number $\alpha$ is expressed as a function of the partial sum delivered by the first group of adders by the equation:

$$\alpha = y_0 + y_1 + y_2 + y_3 + C + p'$$

Let $z_0, z_1$ be the partial sums computed by the second group of adders 155, 156 the carry inputs of which are respectively at logic 1 and logic 0:

$$z_0 = y_0 + y_1 + 1$$

$$z_1 = y_2 + y_3 + 0$$

The number $\alpha$ is expressed as a function of the partial sums delivered by the second group of adders by the equation:

$$= z_0 + z_1 + C + p' - 1$$

Let $S_0$ be the sum computed by the final adder 157 the carry input of which receives the value $p'$ of the parity bit:

$$S_0 = z_0 + z_1 + p'$$

The number $\alpha$ is expressed as a function of $S_0$ by the equation:

$$\alpha = S_0 + C - 1$$

Consequently, the word digital sum is given by:

$$SNM = 2k(S_0 + C - 8)$$

Assuming, as is in fact the case, that the inversion bit C is at logic 0 when it is added to the block of 12 bits delivered by the demultiplexer 10 and to the modified value $p'$ of its parity bit, the word digital sum SNM is expressed as a function of the number $S_0$ delivered at the output of the adder 157 by the equation:

$$SNM = 2k(S_0 - 8)$$

The constant k may be taken as $\frac{1}{2}$ for simplification. The sum $S_0$ delivered by the adder 157 equal to the sum of the 15 bits of the word formed by the block of 12 bits delivered by the demultiplexer 10, the modified value $p'$ of its parity bit and the two carry bits is expressed on four bits. The value of the word digital sum SNM is obtained by subtracting the value 8 from the sum $S_0$. In two's complement four-digit binary arithmetic this subtraction is done by adding 1000 so that it may be assumed that the sum $S_0$ represents, in this arithmetic, the word digital sum assigned a negative sign. The negative sign can be ignored as it can be included in the constant k which is then taken as $-\frac{1}{2}$.

FIG. 3 shows in detail the second computation logic circuit 16 of the encoder. It has been designed to allow for the fact that the word digital sum is delivered to it in two's complement four-digit binary arithmetic. It incorporates a full binary adder 160 for two four-bit binary numbers having its output looped to one input through the intermediary of parallel registers 161 loaded at the occurence rate Fe/12 of the blocks of 12 bits at the output of the demultiplexer 10 by means of a clock signal from the timebase 11. The remaining input of the adder 160 is connected to the output of the first computation logic circuit supplying the sum $S_0$ through the intermediary of a sign multiplier controlled by the inversion decision circuit 19 and constituted by a set of four "exclusive-OR" type logic circuits with inverted outputs 162, 163, 164, 165. Under instruction from the decision circuit 19, this sign multiplexer computes or does not compute the one's complement of the sum $S_0$ delivered by the first computation logic circuit. On each one's complementing of the sum $S_0$ a logic 1 is applied to the carry input of the adder to transform it into two's complementing and so to invert the sign.

Note that the adder 160 can be looped on itself because of the coding principle adopted whereby a running digital sum SNM initialized to zero remains within the range variation of the word digital sum SNM.

FIG. 3 also shows the two-input "exclusive-OR" type logic gate of the inversion decision circuit 19 which has a normal output 190 and an inverted output 191. One input of this logic gate is connected to the sign bit $S_{04}$ (MSB) of the sum $S_0$ delivered by the first computation logic circuit 15 whereas the other is connected to the output of the parallel registers 161 assigned to the most significant bit of the output of the adder 160. The normal output 190 delivers the inversion command signal C which commands the inverted output "exclusive-OR" type logic gates 162, 163, 164, 165 carrying out the one's complementing of the sum $S_0$ whereas the complemented output 191 is connected to the carry input of the adder 160.

When the word digital sum SNM has the same sign as the running digital sum SNC and it is necessary to invert the block of 12 bits delivered by the demultiplexer 10 and the modified value $p'$ of its parity bit the "exclusive-OR" logic gate 19 receives the same logic level on both its inputs. It then delivers on its normal output 190 a logic 0 whereby the logic gates 162, 163, 164 and 165 exercize an inverting function relative to the sum $S_0$ (one's complement) and on its complemented output 191 a logic 1 applied to the carry input of the adder 160 converting the one's complement of the sum $S_0$ into a two's complement and so commanding a subtraction operation. When the word digital sum SNM has the opposite sign to the running digital sum SNC and it is not necessary to invert the block of 12 bits delivered by the demultiplexer 10 and the modified value $p'$ of its parity bit P the "exclusive-OR" logic gate 19 receives different logic levels on its two inputs. It then delivers a logic 1 on its normal output rendering the logic gates 162, 163, 164 and 165 transparent to the sum $S_0$ and a logic 0 on its complemented output 191 commanding an addition operation.

FIG. 3 also shows the inverter circuit 21 which comprises a set of 13 two-input inverted output "exclusive-OR" type logic gates each having one input connected to the output 190 of the logic gate constituting the inversion decision circuit 19 and respectively receiving on the other inputs 12 bits of the block delivered by the demultiplexer 10 and the modified value p' of its parity bit delivered by the first computation logic circuit 15. With regard to the block of 12 bits delivered by the demultiplexer 10 and the modified value p' of its parity bit this set of 13 logic gates behaves as an inverting or transparent circuit according to whether it receives a logic 0 or a logic 1 from the inversion decision circuit 19.

Figure 4:
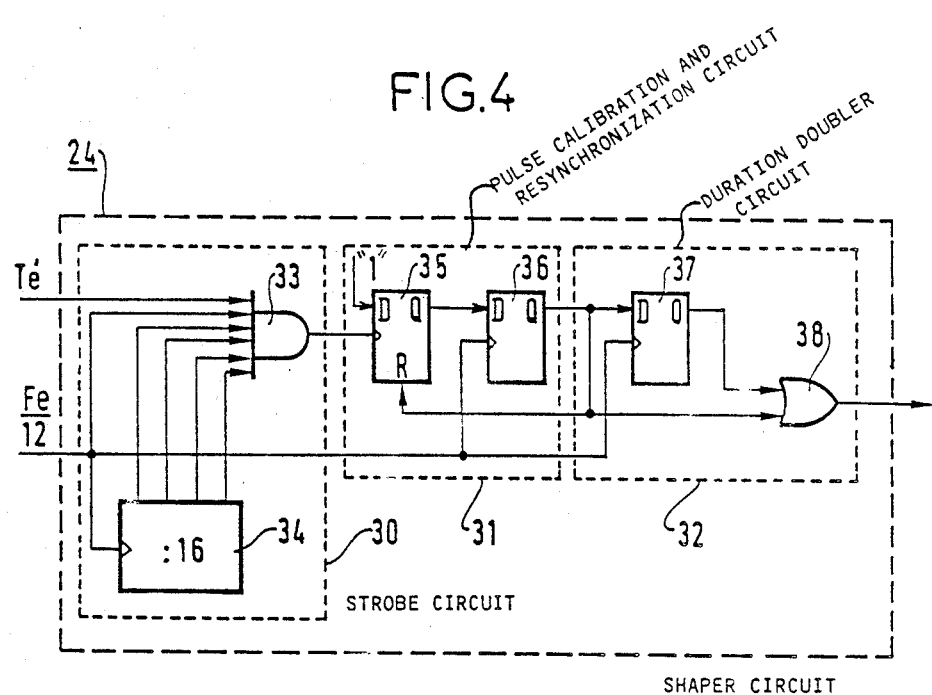
FIG. 4 is a schematic showing a digital service channel shaping circuit forming part of the digital service channel insertion circuit shown in FIG. 1.

FIG. 4 shows in detail the shaper circuit 24 of the circuit for inserting the digital service channel binary data Té into the parity channel. It comprises at the input a strobe circuit 30 which strobes the binary data Té every 16 code words for the duration of a code half-word followed by a pulse calibration and resynchronization circuit 31 which converts each sample at logic 1 into a pulse coinciding in duration with a code word and a duration doubler circuit 32 assigning to the pulses the duration of two code words.

The strobe circuit 30 comprises at the input a six-input "AND" type logic gate 73 which receives on one input the binary data Té and on the other inputs the clock signal at the frequency Fe/12 from the timebase 11 timing the occurence of the blocks of 12 bits at the output of the multiplexer 10 or of the code words at the output of the demultiplexer 22 and the output signals from the various stages of a counter-divider by sixteen 34 incremented by the same Fe/12 clock signals.

The pulse calibration and resynchronization circuit 31 comprises two D type buffer register stages 35, 36. The first buffer register stage 35 has its clock input connected to the output of the logic gate 33, its D input held at logic 1 and its reset to zero input connected to its output Q through the intermediary of the second buffer register stage 36 which is connected to it by its D input and which is clocked by the Fe/12 clock signal. The first register stage 35 returns to the zero state at the end of each code word if not already at zero whereas the second copies the state of the first at the end of a code word for the duration of the next code word.

The duration doubler circuit 32 comprises a D type register stage 37 connected by its D input to the Q output of the second buffer register 36 of the pulse calibration and resynchronization circuit 31 and clocked by the Fe/12 clock signal and a two-input "OR" type logic gate 38 connected to the D input and to the Q output of the D type register stage 37. Any pulse during a code word generated by the pulse calibration and resynchronization circuit 31 is transmitted by the logic gate 38 and prolonged over the next code word by storing it in the D type register 37.

In the presence of digital service channel binary data at logic 0 the strobe circuit 30 does not generate any pulse intended for the pulse calibration and resynchronization circuit 31. The duration doubler circuit 32 holds its output at logic 0 and commands the modulator 25 to deliver a modified value p' of the parity bit equal to the real value p of the parity bit. It is just as if the circuit for inserting the digital service channel binary data Té did not exist and the code words available at the output of the encoder in the binary data bit stream Ts are all of even parity.

Data at logic 1 is prolonged in the digital service channel over a duration of 16 consecutive code words. In the time interval to transmit 16 consecutive code words corresponding to its occurence it causes transmission by the strobe circuit 30 of a pulse having a duration near that of half a code word. This pulse is processed by the pulse calibration and resynchronization circuit 31 and by the duration doubler circuit 32 so as to coincide with the duration of transmission of two of 16 code words and to cause through the intermediary of the modulator 25 complementing of the parity bit corresponding to these two code words. In this way, of the 16 code words transmitted by the encoder in the binary data bit stream Ts during the occurence of data at logic 1 on the digital service channel two consecutive code words are transmitted with an abnormal odd parity violating the parity law and the other 14 with a normal even parity.

Figure 5:
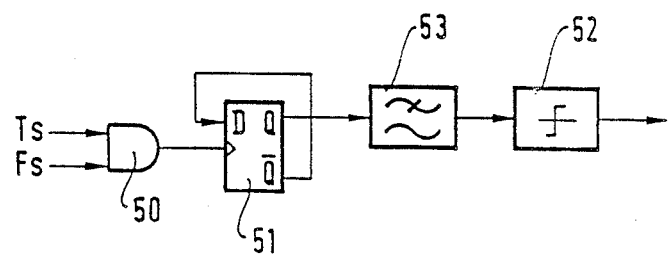
FIG. 5 is a schematic showing an analog line error detector circuit exploiting the statistical properties of a parity checking code.

FIG. 5 shows in detail an analog line error detector circuit responsive to parity law violations. The latter comprises a two-input "AND" type logic gate 50 receiving the line digital bit stream Ts resulting from the previous 12B1C1P encoding and the line clock signal Fs followed by a bistable circuit 51 the output of which is connected to a threshold level comparator 52 through the intermediary of a low-pass filter 53.

On each logic 1 in the bit stream Ts the "AND" type gate 50 generates a pulse which is resynchronized to the elementary time interval and used to change the state of the bistable circuit 51.

As the code words are all even in the absence of parity law violations, the bistable circuit 51 is still in the same output state after the parity bit of each code word although it does not have any preferred output state in any other code word position. Over a large number of elementary time intervals the output state assumed by the bistable circuit 51 as the parity bits pass through is in the majority and its 0 or 1 value influences the level of the DC component of the output signal of this bistable circuit 52.

The low-pass filter 53 extracts the DC component from the output signal of the bistable circuit 51 and the threshold level comparator 52 compares the level of this component with a threshold intermediate the two levels assumed by the component of the output signal of the bistable circuit 51 according to whether its output is at logic 0 or at logic 1 when the parity bits pass through.

In the event of an isolated parity law violation the bistable circuit 51 output changes state as the parity bits pass through which eventually causes a change of level in the DC component of its output signal which is detected by the threshold comparator 52.

In the event of two consecutive parity law violations the bistable circuit 51 output changes state twice on the two incorrect values of the parity bit so that on subsequent parity bits it is the same state as the output at the parity bits previous to the violations and the level of the DC component of its output signal has insufficient time to change sufficiently for the threshold comparator 52 to perceive a change.

More generally, it is seen that this analog detector circuit responds to line errors resulting in isolated or odd numbers of parity law violations but that it is not responsive to errors producing isolated pairs of consecutive coding law violations.

The transmission of digital service channel binary data at logic 1 on the parity channel of the digital bit stream Ts produces parity law violations on two consecutive code words from 16 that are not perceived by the analog detector circuit. In the worst case situation (all binary data of the low data rate digital bit stream Té at logic 1) these pairs of consecutive violations reduce the percentage of the majority states in the output signal of the bistable circuit by ⅛th at most, which is entirely tolerable with currently accepted threshold margins.

Figure 6:
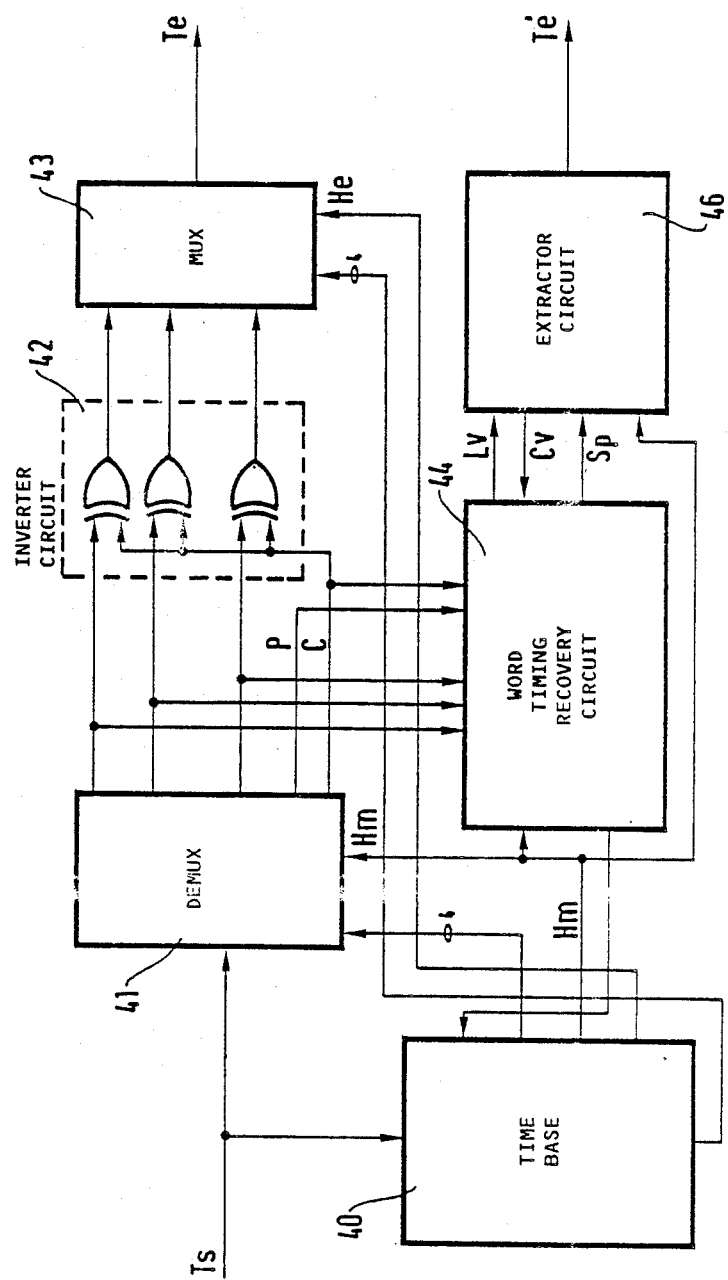
FIG. 6 is a schematic representation of a circuit for extracting the digital service channel transmitted by the parity channel shown in the context of the component parts of an MB1C1P decoder.

FIG. 6 is a functional block schematic of a 12B1P1C decoder for recovering the original high data rate binary data bit stream Te from the transmitted digital bit stream Ts and which is associated with a circuit for extracting the service channel from the parity channel delivering the low data rate binary data bit stream Té.

The decoder has at the input a timebase 40 recovering the elementary time intervals of the incoming binary data bit stream Ts and generating various timing signals including a word clock pulse signal Hm synchronized on the subdivision into 40-bit words used when encoding and a bit clock pulse signal He giving the timing of the high data rate decoded binary bit stream Te and a demultiplexer 41 which is addressed by the timebase 40 and synchronized by the word clock signal Hm from the latter and which converts the incoming binary data bit stream Ts into successive words of 14 parallel bits with a subdivision identical to that used for encoding. The demultiplexer 41 is followed by an inverter circuit 42 which complements or does not complement the part of each word corresponding to the 12-bit block used for encoding according to the value of the inversion bit C marked by its position in a word and a multiplexer 43 which is addressed by the timebase 40 and synchronized by the bit clock signal He from the latter and which converts the successive blocks of 12 parallel bits delivered by the inverter circuit 42 into a decoded synchronous binary data bit stream Te. The decoder is completed by a word timing recovery circuit 44. Associated with a circuit 46 for extracting the service channel from the parity channel delivering the low data rate binary data bit stream Té, it operates on the timebase 40 by cycle stealing and functions by checking the parity of the 14-bit words delivered by the demultiplexer 41 ignoring parity violations signalled to it by the service channel extractor circuit 46 as being due to transmission of the low data rate binary data bit stream Té.

Figure 7:
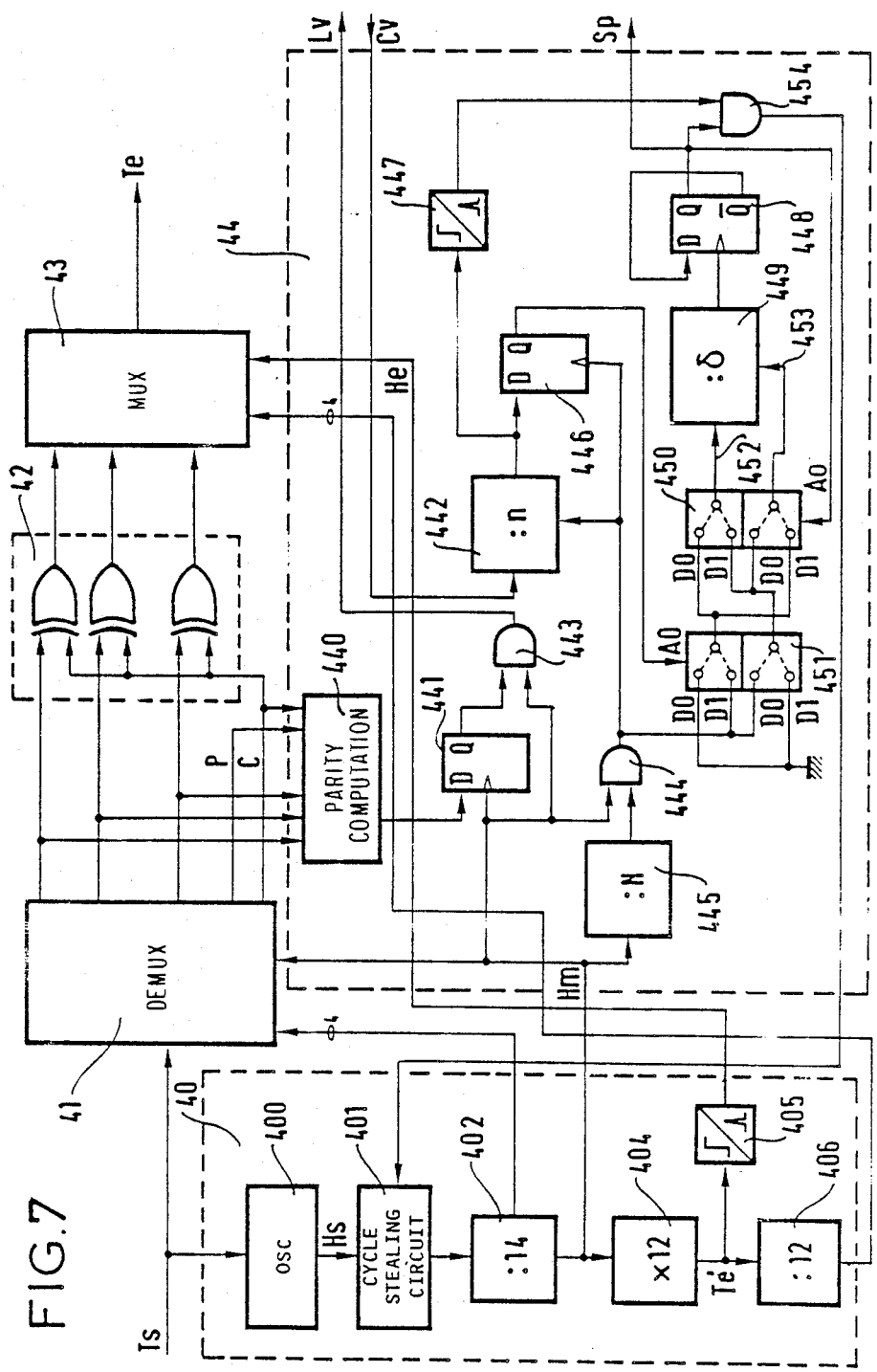
FIG. 7 is a schematic showing a timebase and a word synchronisation recovery circuit which are component part of the decoder from FIG. 6.

The timebase 40 and the word timing recovery circuit 44 are shown in more detail in FIG. 7. The latter comprises at the input an oscillator 400 which is phase-locked to the transitions in the incoming binary data bit stream Ts and delivers a clock signal Hs which has a frequency corresponding to the data rate of the incident binary data bit stream Ts. This oscillator 400 is followed by a cycle stealing circuit 401 and a divider by fourteen 402 which commands addressing of the demultiplexer 41 and delivers a symmetrical squarewave word clock signal Hm the frequency of which corresponds to the timing of the succession of 14-bit words used for encoding and the rising edges of which time the word changes at the output of the demultiplexer 41. A frequency multiplier by twelve 404 following on from the divider by fourteen 402 generates a signal the frequency Fe of which corresponds to the data rate of the decoded binary data bit stream Te and the rising edges of which are converted into bit clock pulses He by a pulse generator 405. A divider by twelve 406 following on from the multiplier 404 supplies the signal for addressing the multiplexer 43.

The cycle stealing circuit 401 can mask on demand a cycle of the oscillator 400 (it is an "AND" type logic gate, for example) and so retard the word clock pulses Hm by one received data duration. This makes it possible to modify the relative locations of data in the subdivision into 14 bit words until the correct subdivision is achieved.

The word synchronization recovery circuit 44 comprises a parity law violation detector circuit constituted by a parity computation circuit 440 receiving the 14 parallel bits from the output of the demultiplexer 41, an error quantifier and a resynchronization control circuit.

The parity computation circuit 440 is not described in detail as it of conventional design. Implemented by means of a cascade of "exclusive-OR" type logic gates, for example, it delivers a binary signal at logic 0 in the case of even parity 14-bit words or logic 1 in the converse case. It is followed by a strobed read circuit formed by a D type flip-flop 441 and an "AND" type logic gate 443. The D type flip-flop 441 is clocked by the word clock signal Hm and connected by its D input to the output of the parity computation circuit 440. The "AND" type logic gate has its two inputs driven by the word clock signal Hm and by the Q output signal of the flip-flop 441. It generates a parity violation detection pulse Lv of calibrated width coincident with a pulse of the clock signal Hm on each 14-bit code word for which the parity computation circuit 440 finds an odd parity. This pulse is intended for the service channel extractor circuit 46 to be described subsequently.

The error quantifier circuit receives from the service channel extractor circuit 46 a parity error count pulse signal Cv and reacts when the number of parity errors exceeds a predetermined integer number n for N consecutive 14-bit words delivered by the demultiplexer 42. It comprises at the input a presettable downcounter-divider by n 442 receiving on its downcounting input the parity error count pulses Cv and on a presetting to n input a word clock pulse Hm selected every N words in the word clock signal Hm by means of a two-input "AND" type logic gate 444 commanded by the word clock signal Hm and by the output signal of a divider by N 445 operating on the word clock signal Hm. The downcounter-divider by n 442 delivers at the output a binary signal normally at logic 0 going to logic 1 immediately the count reaches the null value. It is followed by a D type flip-flop 446 which stores its output state before it is preset each time and a pulse generator 447 delivering each time it passes through the 0 state a positive pulse for commanding the cycle stealing circuit 401 of the timebase 40 not to transmit one cycle of the oscillator 400 to retard by the duration of one time interval of the incident bit stream Ts the word clock signal Hm determining the subdivision into 14-bit words.

The resynchronization control circuit monitors through the intermediary of an "AND" type logic gate 454 the transmission of pulses from the pulse generator 447 so as to authorize it only in the event of loss of synchronization, which loss is assumed if there are more than n parity error count pulses Cv in δ consecutive groups of N 14-bit words delivered by the demultiplexer 41. It includes a D type flip-flop 448 configured as a divider by two generating on its Q output a loss of synchronization binary signal Sp at logic 1 in the event of loss of synchronization and at logic 0 in the converse case and which is used to command the "AND" type logic gate 454 and which is also transmitted to the service channel extractor circuit 46. This D type flip-flop 448 receives its clock signal from a presettable downcounter-divider by δ 449 having two two-stage selectors 450, 451 driving its downcounting input 452 and its presetting input 453.

The first selector 450 is configured as an inverter driving the downcounting input 452 and the presetting input 453 of the downcounter-divider 449. It is commanded by the loss of synchronization signal Sp available at the Q output of the D type flip-flop 448. The second selector 451 is configured as a switch for applying to one or the other of its stages, not both, word clock pulses Hm selected every N words by the "AND" type logic gate 444. It is commanded by the Q output of the D type flip-flop 446 memorizing passages through the 0 state of the downcounter-divider by n 442.

The downcounter-divider 449 generates at its output a logic 0 which changes to logic 1 when the count reaches the null value, this transition changing the state of the D type flip-flop 448 generating the loss of synchronization signal Sp.

The loss of synchronization signal Sp at logic 0 represents locking-on word synchronization, disables the logic gate 454 to prevent any cycle stealing in the timebase 40 and addresses the first selector 450 so as to route, in cooperation with the second selector 451, the word clock pulses Hm delivered every N consecutive words by the logic gate 444 either to the downcounting input 452 if they correspond to groups of N words for which there have been counted down more than n parity error counting pulses Cv in each of them or to the presetting to δ input 453 if they correspond to groups of N words none of which has given rise to more than n parity error count pulses Cv.

The loss of synchronization signal Sp at logic 1 represents a process of word synchronization acquisition following loss of alignment, re-enables the logic gate R454 to authorize cycle stealing in the timebase 409 and commands addressing of the first selector 450 so as to route, in cooperation with the second selector 451, the word clock pulses Hm delivered every N consecutive words by the logic gate 444 either to the downcounting input 452 if they correspond to groups of N words none of which has given rise to more than n parity error count pulses Cv or to the presetting to δ input 453 if they correspond to groups of N words for which there have been counted down more than n parity error count pulses Cv.

The integers n, N and δ are chosen in such a way as to optimize parameters such as invulnerability to line errors (interval between false declarations of loss of word synchronization due to line errors) probability of false recovery of word synchronization, word resynchronization reacquisition time.

Figure 8:
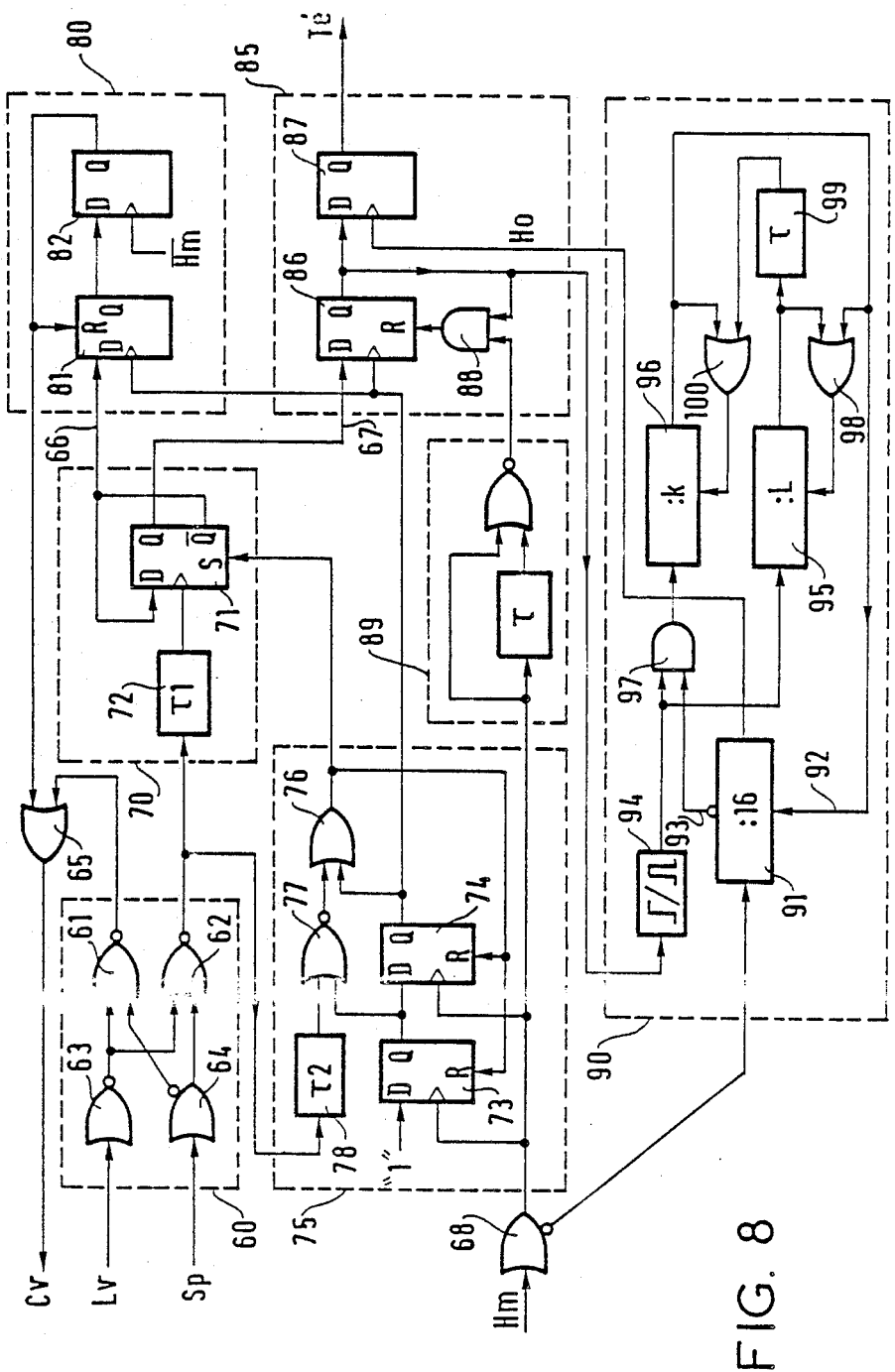
FIG. 8 is a schematic showing in detail the structure of the circuit for extracting the low data rate digital bit stream shown in FIG. 6.

FIG. 8 shows in detail the service channel extraction circuit 46. This has at the input a switching circuit 60 which, depending on whether decoder word synchronization is lost or locked on, routes the parity violation detection pulses Lv either directly to an "OR" type logic gate 65 that returns them to the word synchronization circuit 44 in the form of parity error count pulses Cv or to a discriminator recognizing the parity violation detection pulses Lv corresponding to parity violations caused by transmission of the low data rate service channel data bit stream Té. The discriminator is formed by a modulo 2 counter 70 associated with a count window limiter circuit 75 and has a first output 66 for signalling parity violations detected on isolated code words and a second output 67 for signalling parity violations detected on two consecutive code words. The first output 66 of the discriminator is taken to a regenerator circuit 80 which converts for forwarding to the "OR" type logic gate 65 any indication of parity violations detected on an isolated code word into a parity error count pulse whereas the second output 67 of the discriminator is taken to an service channel read circuit 85 timed by an service channel resynchronization circuit 90 which interprets indications of parity violation detected on two consecutive code words as data at logic 1 in the low data rate bit stream Té.

The switching circuit 60 includes two "NOR" type logic gates 61, 62 each with two inputs which receive the parity violation detection pulses Lv complemented by an inverter gate 63 and which are commanded in opposition by means of a gate 64 with inverting and non-inverting outputs driven by the loss of synchronization signal Sp.

In the event of loss of word synchronization the parity violation detection pulses Lv are returned to the output as parity error count pulses Cv by virtue of the logic 1 in the loss of synchronization signal Sp which disables the logic gate 62 and the complemented form of which enables the logic gate 61.

All parity violations are then regarded as errors and returned to the word synchronization recovery circuit 44 for use in resynchronization.

In the event of word synchronization locking the parity violation detection pulses Lv are applied both to the modulo 2 counter 70 and to the counting window limiter circuit 75 of the discriminator, the direct loop to the output being opened because of the logic 0 in the loss of synchronization signal Sp which enables the logic gate 62 and the complemented version of which disables the logic gate 61.

The modulo 2 counter 70 comprises a D type flip-flop 71 configured as a divider by 2 with a set to 1 control input commanded by the counting window limiter circuit 75 and with a clock input connected to the output of the logic gate 65 of the switching circuit 60 through a circuit 72 introducing a time-delay $\tau 1$.

The counting window limiter circuit 75 includes two D type flip-flops 73, 74 connected like stages of a shift register. The first has its D input at logic 1, is clocked by the word clock signal Hm supplied by a gate 68 with inverting and non-inverting outputs and is reset to 0 by means of an "OR" type logic gate 76 with two inputs of which one is connected to the output of the second D type flip-flop 74 and the other is connected to the output of a "NOR" type logic gate 77 with two inputs of which one is connected direct to the Q output of the first D type flip-flop 73 and the other is connected through the intermediary of a circuit 78 introducing a time-delay $\tau 2$ to the output of the logic gate 62 of the switching circuit 60.

The first flip-flop 73 memorizes the operated or unoperated state of the counting window limiter circuit 75 whereas the second 74 signals the end of a counting window by a pulse on its Q output. The combination of the logic gates 76, 77 which command the resetting to 0 of the flip-flops 73, 74 also controls the resetting to 1 of the flip-flop 71 of the modulo 2 counter 70. It makes it possible either to maintain unoperated the count window limiter circuit 75 and the modulo 2 counter 70 if they are already unoperated and there is no parity violation detection pulse at the output of the logic gate 62 of the switching circuit 60 or to have them returned to the unoperated state at the end of a count window. If a parity violation detection pulse appears and triggers the window limiter circuit 75 and the modulo 2 counter 70, the time-delay circuit 78 guarantees that the pulse is extended at the logic gate 77 for a time sufficient to see the occurence of an edge of the clock signal Hm triggering the change to logic 1 at the Q output of the first flip-flop 73. The time-delay τ2 that it introduces is less than that τ1 introduces by the time-delay circuit 72 so that a parity violation detection pulse that has triggered the count window limiter circuit 75 and release of the flip-flop 71 of the modulo 2 counter 70 also causes the latter to change state.

In the absence of any parity violation detection pulse at the output of the logic gate 62 of the switching circuit 60 in a period greater than the duration of one code word the count window limiter circuit 75 returns to the unoperated state if not already in that state and locks the modulo 2 counter 70 at logic 1.

On the occurence of a parity violation detection pulse at the output of the logic gate 62 of the switching circuit 60 the window limiter circuit 75 which was unoperated is triggered, releases the modulo 2 counter 70 the output of which goes to logic 0, remains triggered throughout the duration of the next code word and then generates an end of count window pulse before returning to the unoperated state and again locking the modulo 2 counter 70 at logic 1.

During the triggering time of the count window limiter circuit 75 the modulo 2 counter 70 which has gone to logic 0 remains at logic 0 unless a second parity violation detection pulse occuring during the code word following the first word prematurely resets it to logic 1.

The pulse regenerator circuit 80 includes a first D type flip-flop the D input of which is connected to the Q output of the flip-flop 71 of the modulo 2 counter 70 and the clock input of which is connected to the Q output of the second flip-flop 74 of the count window limiter circuit 75 and a second flip-flop 82 the D input of which is connected to the Q output of the first flip-flop 81 and the clock input of which is connected to the inverted output of the gate 68 delivering the complemented word clock signal $\overline{Hm}$. The Q output of this second flip-flop 82 is connected to an input of the "OR" type logic gate 65 and controls a reset to 0 input of the first flip-flop 81.

The first flip-flop 81 strobes the output state of the modulo 2 counter 70 at the end of each count window marked by the output pulse from the flip-flop 74 with a slight time-delay relative to the rising edge of the word clock signal Hm due to the transition delay time of the flip-flop 74. Its Q output goes to logic 1 each time that the modulo 2 counter 70 is at logic 0 at the end of a count window and thus signals a parity violation detection pulse on an isolated code word that can only correspond to a transmission error. The second flip-flop 82 strobes the state of the Q output of the first flip-flop 81 in the second part of the period of each code word. If it finds logic 1 at the output of the first flip-flop 81 it resets the latter to 0 and generates for forwarding to the word synchronization recovery circuit 44 a parity error count pulse Cv calibrated to the width of a word synchronization pulse Hm.

The service channel read circuit 85 includes a first D type flip-flop 86 with its D input connected to the Q output of the flip-flop 71 of the modulo 2 counter 70 and its clock input connected to the Q output of the second flip-flop 74 of the count window limiter circuit 75, a second D type flip-flop 87 with its D input connected to the Q output of the first flip-flop 86 and its clock input connected to the output of the service channel resynchronization circuit 90, and a two-input "AND" type logic gate 88 which controls a reset to 0 input of the first flip-flop 86 and the inputs of which are connected one to the Q output of the first flip-flop 86 and the other to a recalibrator circuit 89 extending the length of the word clock signal Hm pulses before complementing them.

The first flip-flop 86 strobes the output state of the modulo 2 counter 70 at the end of each count window marked by the pulse at the output of the flip-flop 74 with a slight time-delay relative to the rising edge of the word clock signal Hm due to the transition time-delay of the flip-flop 74. Its Q output goes to logic 1 each time that the modulo 2 counter 70 is at logic 1 at the end of a count window and so signals parity violation detection pulses on two consecutive code words which are to be interpreted as the result of transmission of data at logic 1 in the low data rate service channel binary bit stream Té. This first flip-flop 86 is reset to 0 by means of the logic gate 88 and the recalibrator circuit 89 at the end of periods of word clock signal Hm when its Q output has gone to logic 1.

The second flip-flop 87 delivers the low data rate binary bit stream Té by strobing the state of the Q output of the first flip-flop 86 during code words in which positive transitions of the latter may appear at a timing rate equal to 1/16th that of the word clock signal Hm by virtue of a clock signal Ho recovered from the low data rate data bit stream Té delivered by the service channel resynchronization circuit 90.

The service channel resynchronization circuit 90 includes a counter-divider by sixteen 91 which supplies the recovered clock signal Ho and which is driven by the complemented version of the word clock Hm available at the complemented output of the gate 68 in such a way as to cause the second flip-flop 87 to operate in the second part of the code word period after any positive transitions of the first flip-flop 86. The counter-divider by sixteen 91 has a reset to 15 input 92 and an output 93 signalling the 15 state to which is connected a synchronization loop locking its passage through state 15 to coincide with the position over an interval of 16 code words of the positive transitions of the first flip-flop 86 of the service channel read circuit 80. This synchronization loop counts positive transitions of the first flip-flop 86 and causes resetting to 15 of the counter-divider by sixteen 91 on one of these transitions immediately more than k transitions are counted from L occuring outside the 15 state of the counter-divider by sixteen 91. To this end it includes a positive transition detector 94 which is connected to the Q output of the first flip-flop 86 of the service channel read circuit 85 and delivers count pulses each time this output changes from logic 0 to logic 1, a counter-divider by L 95 and a counter-divider by k 96 timed by the positive transition detector 94, one of them (95) directly and other of them (96) through the intermediary of an "AND" type logic gate 97 blocking pulses arriving during the 15 state of the counter-divider by sixteen 91. The counter-divider by L 95 has its overflow output connected to its own reset to 0 input through an "OR" type logic gate 98 and to the reset to 0 input of the counter-divider by k 96 through the intermediary of a time-delay circuit 99 and an "OR" type logic gate 100. The counter-divider by k 96 has its overflow output connected to its own reset to 0 input through the intermediary of the "OR" type logic gate 100, to the reset to 0 input of the counter-divider by L 95 through the intermediary of the "OR" logic gate 98 and to the reset to 15 input of the counter-divider by sixteen 91.

In the event of loss of synchronization the counter-divider by k 96, which has a smaller capacity than the counter-divider by L 95, receives most of the pulses from the transition detector 94 and overflows before the counter-divider by L 95 causing on the occurence of one of these pulses the resetting to 15 of the counter-divider by sixteen 91 so that it goes to 0 on the on same code word period and triggers the flip-flop 87, resets itself to 0 and resets to 0 the counter-divider by L 95.

When synchronization is locked on, the counter-divider by k 96 receives few or no pulses from the transition detector 94 so that the counter-divider by L 95 overflows before it and resets it to 0 before it has been able to command resetting to 15 of the counter-divider by sixteen 91.

The embodiment that has just been described relates to a high data rate digital bit stream transmitted in MB1C1P code but it is obvious that the invention applies to high data rate digital bit streams transmitted in other parity checking codes such as for example the MB1P code whereby every M data bits there is inserted a parity bit or alphabet codes in which a variable period parity check is introduced by selectively replacing words of the alphabet with other words not normally used so as to maintain a given parity.

We claim:

1. Method of transmitting a digital service channel by means of the parity channel of a digital bit stream transmitted in a code with parity checking with parity words inserted at specific times by modifying spaced groups of even numbers of consecutive parity words to violate the parity law of the parity checking code.

2. Method according to claim 1 wherein the data of the service channel bit stream is transmitted in the parity channel of the parity checking digital code bit stream by modifying groups of two consecutive parity words causing in each group two consecutive violations of the parity checking code parity law.

3. Method according to claim 1 applied to a digital bit stream transmitted in MB1C1P type parity checking code in which the data is transmitted by consecutive code words each formed of a block of data bits completed by a parity bit and by an inversion bit indicating whether said block and its parity bit have been inverted to keep the running digital sum within limits wherein the service channel digital bit stream data is transmitted by complementing spaced groups of two parity bits belonging to two consecutive code words before selective inversion of the code words concerned.

4. Device for implementing a method of transmitting a digital service channel by means of the parity channel of a digital bit stream transmitted in a code with parity checking with parity words inserted at specific times by modifying spaced groups of even numbers of consecutive parity words to violate the parity law of the parity checking code in a parity checking code encoder and decoder, said encoder comprising a computation logic circuit adapted to determine the values of the parity words and a multiplexer adapted to define in the encoded bit stream temporal windows for insertion of parity words and said decoder comprising a parity checking code parity law violation detector circuit, which device comprises:

means for inserting digital service channel data into the parity channel which operate in said encoder and comprise a shaper circuit adapted to strobe the digital service channel data at the timing rate of spaced groups of parity words and to deliver samples occupying the duration of a group, a computation logic circuit in said encoder adapted to determine the values of the parity words and a modulator circuit which is commanded by said shaper circuit at the output of said computation logic circuit, and digital service channel extraction means which are operative in said decoder on the signal from said parity law violation detector circuit and adapted to deduce the digital service channel data values from parity law violations detected on an even number of consecutive parity words.

5. Device for implementing a method of transmitting a digital service channel by means of the parity channel of a digital bit stream transmitted in a code with parity checking with parity words inserted at specific times by modifying spaced groups of even numbers of consecutive parity words to violate the parity law of the parity checking code applied to a digital bit stream transmitted in MB1C1P type parity checking code in which the data is transmitted by consecutive code words each formed of a block of data bits completed by a parity bit and by an inversion bit indicating whether said block and its parity bit have been inverted to keep the running digital sum within limits wherein the service channel digital bit stream data is transmitted by complementing spaced groups of two parity bits belonging to two consecutive code words before selective inversion of the code words concerned, which device is implemented in an encoder and decoder of the MB1C1P type, said encoder comprising a computation logic circuit adapted to deliver the normal value of the parity bit, an inverter circuit adapted to receive said normal value, an inversion control circuit adapted to control said inverter circuit and a multiplexer adapted to define in the encoded bit stream windows for inserting inversion bits and parity bits, and said decoder comprising a word timing recovery circuit provided with a parity law violation detector circuit, which device comprises:

means for inserting digital service channel binary data into the parity channel which are operative in said encoder and include a shaper circuit adapted to strobe the digital service channel binary data at the timing rate of spaced groups of two parity bits belonging to two consecutive code words and to deliver samples occupying the duration of a group (that is to say, two code words), said computation logic circuit adapted to deliver the normal value of the parity bit and a modulator circuit controlled by said shaper circuit at the output of said computation logic circuit adapted to substitute for said normal value of the parity bit a modified value, and digital service channel extraction means which are operative in said decoder on the signal from said parity law violation detector circuit and are adapted to deduce the digital service channel data values from parity law violations detected on two consecutive parity bits.

6. Device according to claim 4 wherein said service channel extraction means include a discriminator adapted to recognize detection of parity law violations on two consecutive parity words and which comprises a modulo 2 counter associated with a count window limiter circuit both operating on the signal delivered by said parity law violation detector circuit forming part of said decoder, said count window limiter circuit being adapted to maintain outside its triggering period said modulo 2 counter in a first state and to release said modulo 2 counter over a duration equal to that between two consecutive parity words when it is triggered by the detection of a parity violation, said modulo 2 counter being adapted to indicate parity law violations on two consecutive parity words by a premature return to its first state during triggering of said count window limiter circuit.

* * * * *